United States Patent [19]

Baluja et al.

[11] Patent Number: 6,128,397
[45] Date of Patent: Oct. 3, 2000

[54] METHOD FOR FINDING ALL FRONTAL FACES IN ARBITRARILY COMPLEX VISUAL SCENES

[75] Inventors: Shumeet Baluja; Henry Rowley, both of Pittsburgh, Pa.

[73] Assignee: Justsystem Pittsburgh Research Center, Pittsburgh, Pa.

[21] Appl. No.: 08/975,654

[22] Filed: Nov. 21, 1997

[51] Int. Cl.$^7$ .................................................. G06K 9/00
[52] U.S. Cl. ........................... 382/118; 382/156; 382/195; 382/224
[58] Field of Search .................................... 382/115, 118, 382/156, 159, 181, 190, 195, 201, 203, 206, 224, 296; 348/77

[56] References Cited

U.S. PATENT DOCUMENTS

| | | | |
|---|---|---|---|
| 4,975,960 | 12/1990 | Petajan | 381/43 |
| 5,012,522 | 4/1991 | Lambert | 382/2 |
| 5,164,992 | 11/1992 | Turk et al. | 382/2 |
| 5,283,644 | 2/1994 | Maeno | 348/152 |
| 5,412,738 | 5/1995 | Brunelli et al. | 382/115 |
| 5,438,357 | 8/1995 | McNelley | 348/15 |
| 5,446,803 | 8/1995 | Kunitake et al. | 382/290 |
| 5,448,376 | 9/1995 | Ohta | 358/448 |
| 5,450,504 | 9/1995 | Calia | 382/118 |
| 5,561,718 | 10/1996 | Trew et al. | 382/118 |
| 5,581,625 | 12/1996 | Connell | 382/1 |
| 5,596,362 | 1/1997 | Zhou | 348/14 |
| 5,642,431 | 6/1997 | Poggio et al. | 382/118 |
| 5,835,632 | 11/1998 | Takasu et al. | 382/159 |

FOREIGN PATENT DOCUMENTS 4330578  11/1992  Japan ............................. G06F 15/62

OTHER PUBLICATIONS

Edgar Osuna et al., "Training Support Vector Machines: an Application to Face Detection, IEEE Conference on Computer Vision and Pattern Recognition", Center for Biological and Computational Learning and Operations Research Center, MIT, 1997, pp. 130–136.

Antonio J. Colmenarez et al., "Face Detection With Information–Based Maximum Discrimination", IEEE Conference on Computer Vision and Pattern Recognition, Beckman Institute for Advance Science and Technology, University of Illinois at Urbana–Champaign, 1997, pp. 782–787.

Henry A. Rowley et al., "Neural Network–Based Face Detection", *Computer Vision and Pattern Recognition*, 1996.

Kah–Kay Sung et al., "Example–based Learning for View–based Human Face Detection", Center for Biological and Computational Learning, MIT, Dec. 1994, A.I. Memo No. 1521, C.B.C.L. Paper No. 112, pp. 1–20.

Matthew Turk et al., "Eigenfaces for Recognition", *Journal of Cognitive Neuroscience*, Vision and Modeling Group, The Media Laboratory, MIT, 1991, vol. 3, No. 1, pp. 71–86.

John Hertz et al., *Introduction To The Theory Of Neural Computation*, Santa Fe Institute Studies In The Sciences Of Complexity, Addison–Wesley Publishing Company, 1991, pp. 81–87 and 251–273.

D. Beymer et al., "Example Based Image Analysis and Synthesis", M.I.T., Artificial Intelligence Laboratory, Nov. 1993, A.I. Memo No. 1431, C.B.C.L. Paper No. 80, pp. Abstract, 1–20.

*Primary Examiner*—Bhavesh Mehta
*Attorney, Agent, or Firm*—Webb Ziesenheim Logsdon Orkin & Hanson, P.C.

[57] ABSTRACT

A method for detecting a face in an image includes the steps of applying the image to a first classification tool that determines a rotational angle for rotating the image that makes the image most resemble an upright face; rotating the image by the rotational angle determined by the first classification tool; and applying the rotated image to a second classification tool, which determines whether the rotated image represents a frontal face or not.

21 Claims, 2 Drawing Sheets

METHOD FOR FINDING ALL FRONTAL FACES IN ARBITRARILY COMPLEX VISUAL SCENES

BACKGROUND OF THE INVENTION

1. Field of the Invention

The present invention relates to a method of detecting faces in an image. More particularly, the invention relates to a method for finding all rotated and upright frontal faces in arbitrarily complex visual scenes.

2. Discussion of the Related Art

A number of systems have been developed that recognize the identity of faces in an image once they are first located in the image scene. Several of these systems utilize methods to detect faces based on such factors as motion in the image scene, color information, or searching for a pre-computed set of features, such as nostrils or other facial features. For example, U.S. Pat. No. 5,012,522 discloses a facial recognition system which searches first for both eyes, then the nose, and then finally, the mouth of a person's face in an image. The disclosure notes that faces are never present when there is no motion of the image. Thus, such a system would be unusable for recognizing or detecting faces in a still photograph.

U.S. Pat. No. 4,975,969 discloses a security system which uses a person's physical characteristics to determine whether to grant access to them. A part of this system involves facial recognition. In this arrangement, the person to be recognized assumes a certain position facing a camera. The camera takes a shot of the face, resulting in an input image of mainly a singular, upright, up-close, and frontal view of a face This makes the facial recognition relatively straightforward. However, it is necessary to first detect whether a facial representation is, in fact, in an image before such an facial recognition can be performed. Moreover, it is often desired to locate multiple faces, which are either upright or rotated, in an image. Further, the faces in the image may often be relatively small in comparison to the entire input image. Even further, the input image may often be cluttered with non-facial backgrounds or scenery. Provisions for first detecting whether faces are present in an image including such non-facial features are desired in facial detection systems.

U.S. Pat. No. 5,642,431 discloses a network-based system and method for detecting faces in an image. This method involves first gathering representatives of an object to be detected, for example, pictures of frontal, upright faces (a class A training set). Representatives of other objects are also gathered, for example, pictures which do not include a face (a class B training set). A single neural network and cluster based system is trained to discriminate between classes A and B. This system is tested on a large number of images which do not contain faces. Any of these images which are mistakenly indicated as including a face are added to the class B training set. This system requires computation of a distance metric, for example, the Mahalanobis distance from a set of six clusters, to accomplish the facial detection. This arrangement requires complex mathematical computations and is time consuming.

SUMMARY OF THE INVENTION

Accordingly, the present invention is directed to a method for detecting all frontal faces in arbitrarily complex visual scenes that substantially obviates one or more of the problems due to limitations and disadvantages of the related art.

An object of the present invention is to provide a method for detecting all human faces, of any size, in an image of arbitrary size and complexity.

Another object of the present invention is to provide a facial detection method which detects upright, frontal faces as well as faces that are rotated in the image plane.

Another object of the present invention is to provide a facial detection method which detects faces despite any occlusions of the face, such as a mouth not being visible or only one eye being visible.

Another object of the present invention is to provide a facial detection method which is able to accurately detect faces in an image that also contains non-facial details such as background features that resemble faces.

Another object of the present invention is to provide a facial detection method which does not depend on color information or motion cues.

A final object of the present invention is to provide a facial detection method which detects faces is a variety of image types including television-video images, static images, black-and-white or color images, high and low resolution still photographs, scanned photographs, newspaper images, hand drawings, and paintings.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for detecting a face in an image includes the steps of applying the image to a first classification tool that determines a rotational angle for rotating the image to a position that makes the image most resemble an upright face; rotating the image by the rotational angle determined by the first classification tool; and applying the rotated image to a second classification tool, which determines whether the rotated image represents a frontal face or not.

In another aspect of the present invention, a method for detecting one or more faces in an image displayed by a pixel array, includes the steps of selecting a subimage, of a predetermined array size of pixels centered around a first pixel of the pixel array, from the image; applying the subimage to a first classification tool that determines a rotational angle for rotating the subimage to a position that makes the subimage most resemble an upright face; rotating the subimage by the rotational angle determined by the first classification tool; applying the rotated subimage to a second classification tool, which determines whether the rotated subimage represents a frontal face or not; and repeating the above steps for each pixel in the pixel array of the image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Corresponding elements will be labeled with the same numbers, and a redundant detailed description will be omitted.

Figure 1:
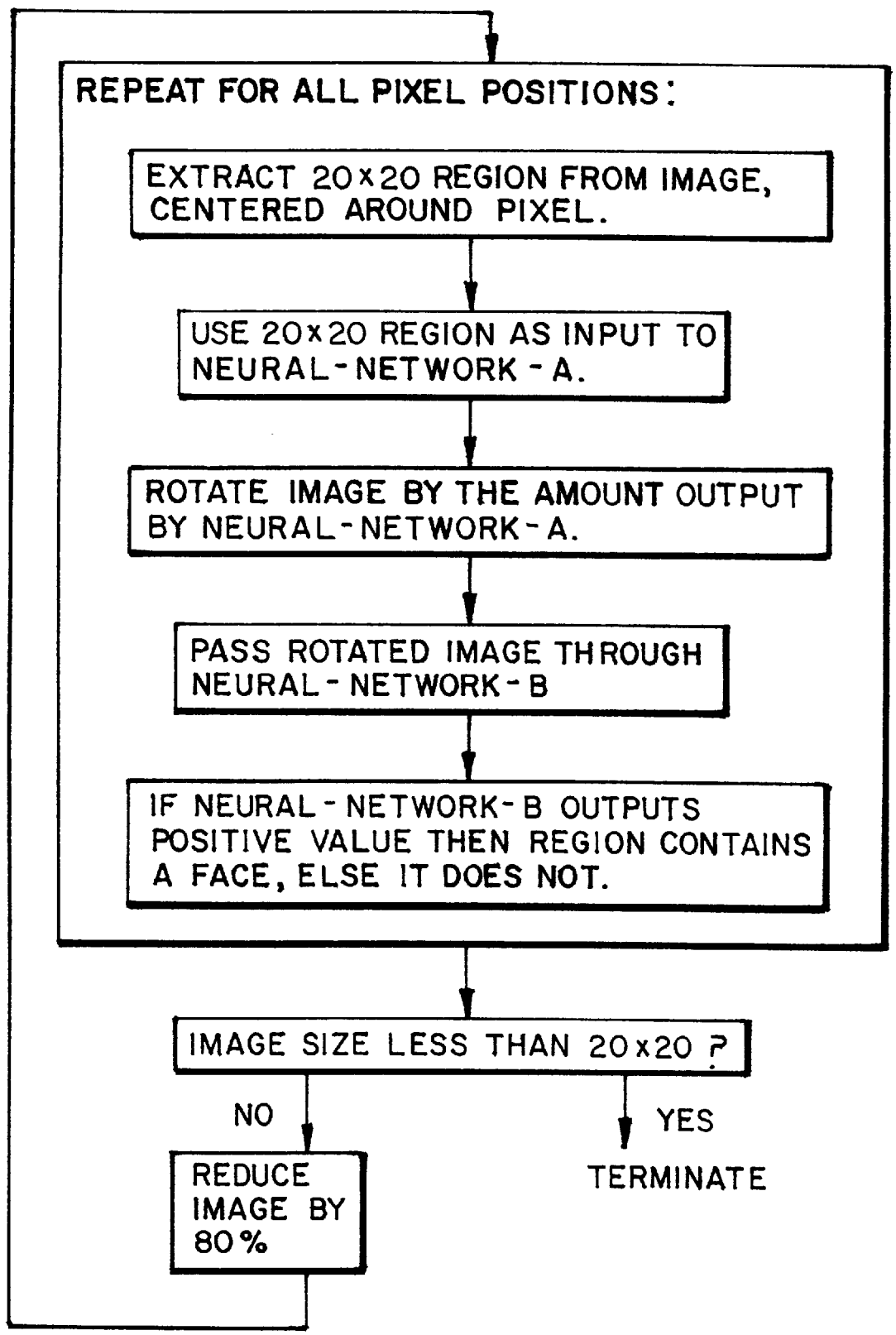
FIG. 1 is a flow chart detailing a method of detecting one or more faces in an input image displayed by a pixel array according to a preferred embodiment of the present invention.
Figure 2A:
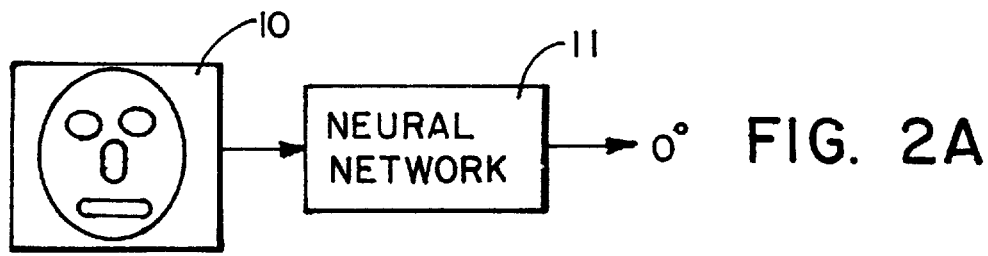
FIG. 2A illustrates an input image of an upright face being applied to a first classification tool.
Figure 2B:
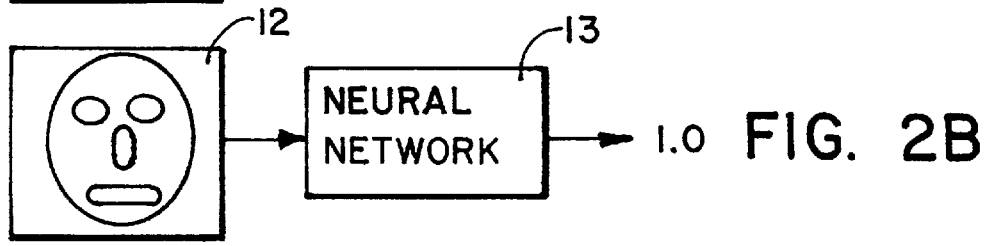
FIG. 2B illustrates an unrotated input image being applied to a second classification tool.

FIG. 1 illustrates a flow chart detailing a method of detecting one or more faces in an input image displayed by a pixel array. According to a first preferred embodiment of the instant invention, a subimage of the image pixel array is selected at the first pixel location in the image pixel array. The subimage is of a predetermined array size, which is preferably 20×20 pixels, centered around the first pixel in the image pixel array. A second preferred embodiment of the instant invention does not involve a subimage, but rather applies the entire image pixel array as the input image array. FIG. 2A illustrates an input image array 10, that is either the subimage of the first embodiment or the entire image pixel array of the second embodiment, applied to a first classification tool 11. In this example, the first classification tool 11 is a statistical classification tool implemented as a neural network and the array size of the input image array 10 is 20×20 pixels. The first classification tool (first neural network) 11 determines a rotational angle by which the input image 10 is to be rotated. The first classification tool 11 receives the input image 10 as input and it outputs the rotational angle. This rotational angle indicates the amount of rotation to apply to the input image 10 to result in the input image 10 being in a position in which it most resembles an upright face.

Figure 3A:
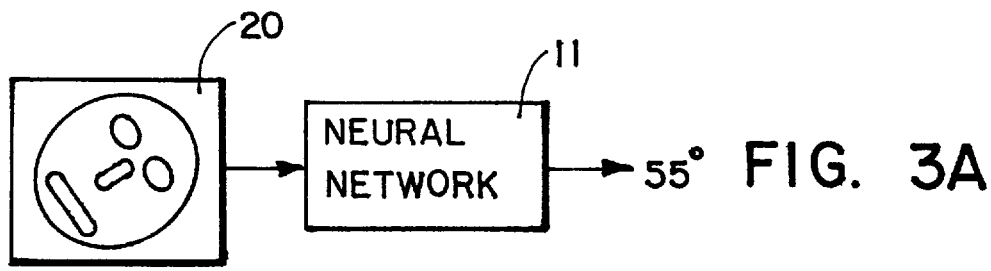
FIG. 3A illustrates an input image of a rotated face being applied to a first classification tool.
Figure 3B:
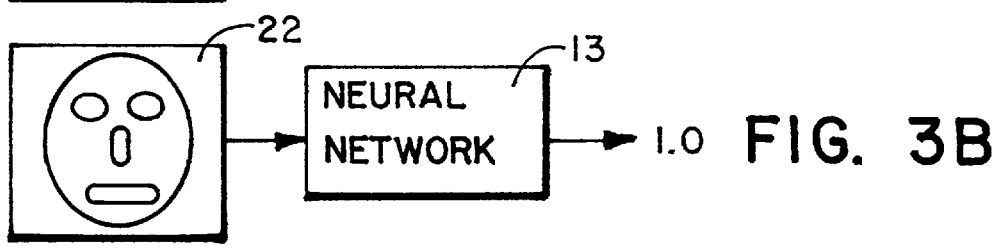
FIG. 3B illustrates a rotated input image being applied to a second classification tool.
Figure 4A:
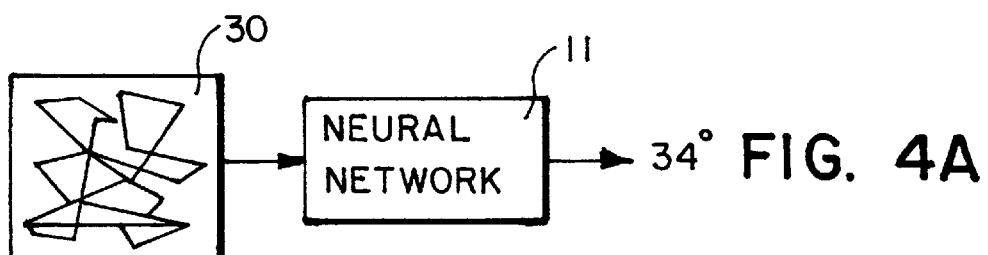
FIG. 4A illustrates an input image containing no face being applied to a first classification tool.
Figure 4B:
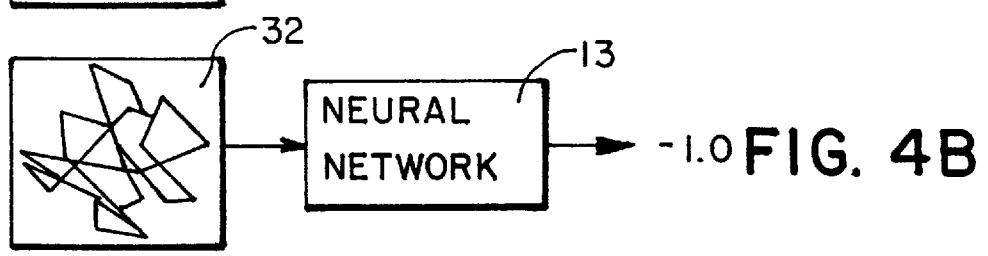
FIG. 4B illustrates a rotated input image containing no face being applied to a second classification tool.

The first neural network 11 is a non-linear regression tool which maps inputs preferably a 20×20 pixel image) to outputs that signify a rotational angle. The regression weights of the network 11 can be set in a variety of ways. For a discussion of neural network training methods see Hertz, Krough & Palmer, "Introduction to the Theory of Neural Computation", Santa Fe Institute, Addison Wesley Publishers, 1991. The first neural network's weights are set via an error-backpropagation algorithm. To set these weights, examples of input to output mappings are required. This is referred to as a training set. The training set in the preferred embodiment of the instant invention includes 20×20 pixel array images of faces which are rotated to various angles between 0 and 360 degrees, each paired with a particular rotation angle. The 20×20 pixel array images are used as input to the first neural network and the rotation angle is used as its output. The weights of the first neural network 11 are set to perform the mapping between input and output. Given a 20×20 image as input, for example, the first neural network 11 will yield, at its output, an angle by which to rotate the input image 10. This input image 10 may be a subimage of the pixel array, as described above in regard to the first preferred embodiment of the instant invention, or the entire pixel array image, as described above in regard to the second preferred embodiment of the instant invention. When the input image 10 is rotated by the rotation angle, it is in the position where it most resembles an upright face as compared with any other possible rotational position of the image. Thus, when an input image contains a rotated face, as in FIG. 3A, this first classification tool 11 will output a rotational angle that will make the rotated face in the image 20 upright. If the input image contains an unrotated face, as in FIG. 2A, a rotational angle of 0 degrees will be output by the first classification tool 11. If the input image does not include a face, as in FIG. 4A, a rotational angle will still be calculated by the first classification tool 11 that would result in the input image 30 most resembling an upright face.

As indicated by the flowchart of FIG. 1, once a rotational angle for the input image has been determined by the first classification tool (the first neural network), the input image is rotated by that rotational angle. Once the input image is rotated, it is applied to a second classification tool 13. In this example, the second classification tool 13 is a statistical classification tool implemented as a second neural network. This second neural network is a non-linear regression tool similar to that disclosed by Rowley, Baluja and Kanade in "Human Face Detection in Visual Scenes", Proceedings of the 1996 Conference on Computer Vision and Pattern Recognition, IEEE press and similar to that disclosed by Sung and Poggio in "Example-based Learning for View-based Human Face Detection", Proceedings from Image Understanding Workshop, Nov. 13–16, 1994 (Morgan Kaufinann, San Mateo, Calif.), 843–850.

The second neural network maps an input array, preferably a 20×20 input pixel array, to outputs which signify whether an upright face is present in the input array or not. There are a variety of ways to set the second neural network's weights. A preferred way is by error-backpropagation. To set these weights, examples of input to output mappings are required. The inputs are, for example, 20×20 images of upright frontal faces and 20×20 images of non-faces. The manually labeled output indicates whether the input is a face or non-face example. The gathering of face examples and non-face examples can be performed in a variety of semi-automated approaches. Two of these approaches are disclosed in the above-mentioned articles by Rowley, Baluja, and Kanade (1996) and Sung and Poggio (1994). The second neural network's weights are set to perform the mapping between input and output. Thus, given a 20×20 image as input, for example, the second neural network 13 will determine whether the input image contains an image of a face or not. As indicated in the flowchart of FIG. 1, if the input image contains a face, the second neural network 13 will output a positive value, for example +1.0. If the input image does not contain a face, the second neural network 13 will output a negative value, for example −1.0.

Thus, the first classification tool 11 determines a value of the rotational angle by which an input image array (the entire image pixel array or a subimage of said image pixel array centered around a first pixel of the image pixel array) is to be rotated. The input image is then rotated the amount specified by the value of the rotational angle. This rotation occurs whether the input image includes a face or not. If it includes a face, the input image will be rotated to a position where it most resembles an upright face. If it does not include a face, the input image will still be rotated to a position where it most resembles an upright face. The input image is then applied to a second classification tool which outputs a value signifying whether it includes an upright frontal face or not.

In the first preferred embodiment of the instant invention, once this procedure is complete for the first pixel in the pixel array of the input image, it is repeated sequentially for each of the remaining individual pixels in the pixel array of the input image. Thus, a potential face can be found in any location of the input image because the first and second classification tools are applied to every pixel location in the input image pixel array.

Also in the first embodiment of the instant invention, if the predetermined array size of the subimage is, for example, 20×20 pixels, then all faces which are of the size 20×20 pixels or less will be located by the above method. In order to find faces that are larger than 20×20 pixels in the original image, the size of the whole image is reduced and the subimage procedure described above is repeated for the entire reduced image, as indicated in the flowchart of FIG. 1. The reduction step can be performed, for example, by subsampling the whole image. The reduction can be of a predetermined amount, for example 80%. Alternatively, the amount that the image is reduced in each iteration can be variable, for example by determining what size of the faces have been detected thus far. The reduction procedure can be repeated an arbitrary number of times, for example until the image is reduced to a size less than 20×20 pixels.

The detection system of the present invention is not dependent on color information of the image, although color information can be incorporated to increase the speed of the system. For example, the search for a face can be commenced in regions of the image where an approximate skin color is found.

The detection system of the present invention is not dependent on motion information of the image such as might be available through video analysis. However, motion information can be incorporated to increase the speed of the system. For example, the search for a face can be commenced in regions of the image where motion is detected.

This invention as disclosed above and in the following claims thus presents an improved method for finding faces in an image, whether the faces are upright or rotated in the image plane. The faces will still be detected even if there is partial occlusion in the face, for example, if only one eye is visible or if the mouth is not visible.

This detection method does not have to depend on color information or motion cues. Similarly, the detection method does not have to depend on pre-specified features such as eye or nostril measurements to perform its task. Instead, an automatic facial detection is performed by statistical procedures utilizing neural networks, for example, as described above.

This detection method can be used to find all of the faces in an input image and can thereby be used to count the number of frontal faces, whether they are rotated or upright, in an image and send the found faces to a separate face recognition system that can then classify the face to determine identity. The method can also be used to detect the angle that the faces are oriented at in the image. Further, the method can be used to find only the largest face in the image.

This method provides the crucial step to creating interfaces between humans and computers such as computer detection of human emotions by facial appearance, location of eye gaze, and security systems which operate based on facial identity. The method disclosed by the foregoing can be run on any personal computer.

It will be apparent to those skilled in the art that various modifications and variations can be made in the inter-pattern dimension measuring apparatus of the present invention without departing from the spirit or scope of the invention. Thus, it is intended that the present invention cover the modifications and variations of this invention provided they come within the scope of the appended claims and their equivalents.

What is claimed is:

1. A method for detecting a face in an unknown input image, comprising the steps of:

applying the unknown input image to a first classification tool that determines a rotational angle for rotating the unknown input image to a position that makes the unknown input image most resemble an upright face;

rotating the unknown input image by the rotational angle determined by the first classification tool; and applying the rotated unknown input image to a second classification tool which determines whether the rotated unknown input image represents a frontal face.

2. A method for detecting a face in an unknown input image as in claim 1, wherein the first classification tool is a neural network, and the second classification tool is a neural network.

3. A method for detecting a face in an unknown input image as in claim 1, wherein the first classification tool is a neural network, and the second classification tool is a plurality of neural networks.

4. A method for detecting a face in an unknown input image as in claim 1, wherein the first and second classifications tools are non-linear regression tools.

5. A method for detecting a face in an unknown input image as in claim 1, wherein the unknown input image is a television-video image.

6. A method for detecting a face in an unknown input image as in claim 1, wherein the unknown input image is a photographic image.

7. A method for detecting a face in an unknown input image as in claim 1, wherein the unknown input image is an image from a newspaper.

8. A method for detecting a face in an unknown input image as in claim 1, wherein the unknown input image is a hand-drawing or a painting.

9. A method for detecting a face in an unknown input image as in claim 1, wherein the method can be run on any personal computer.

10. A method for detecting one or more faces in an unknown input image displayed by a pixel array, comprising the steps of:

selecting from the unknown input image a subimage of a predetermined array size of pixels centered around a first pixel of the pixel array;

applying the subimage to a first classification tool which determines a rotational angle for rotating the subimage to a position that makes the subimage most resemble an upright face;

rotating the subimage by the rotational angle determined by the first classification tool;

applying the rotated subimage to a second classification tool which determines whether the rotated subimage represents a frontal face; and repeating the above steps for each pixel in the pixel array of the unknown input image.

11. A method for detecting one or more faces in an unknown input image as in claim 10, wherein the predetermined array size of the subimaqe is 20×20 pixels.

12. A method for detecting one or more faces in an unknown input image as in claim 10, further comprising the step of:
reducing the unknown input image by a predetermined amount and repeating all of the steps recited in claim 10 in order to find faces in the unknown input image that are larger than the predetermined array size of the subimage.

13. A method for detecting one or more faces in an unknown input image as in claim 12, wherein the reducing step is performed by subsampling the unknown input image.

14. A method for detecting one or more faces in an unknown input image as in claim 10, wherein the first classification tool is a neural network, and the second classification tool is a neural network.

15. A method for detecting one or more faces in an unknown input image as in claim 10, wherein the first classification tool is a neural network, and the second classification tool is a plurality of neural networks.

16. A method for detecting one or more faces in an unknown input image as in claim 10, wherein the first and second classification tools are non-linear regression tools.

17. A method for detecting one or more faces in an unknown input image as in claim 10, wherein the unknown input image is a television-video image.

18. A method for detecting one or more faces in an unknown input image as in claim 10, wherein the unknown input image is a photographic image.

19. A method for detecting one or more faces in an unknown input image as in claim 10, wherein the unknown input image is an image from a newspaper.

20. A method for detecting one or more faces in an unknown input image as in claim 10, wherein the unknown input image is a hand-drawing or a painting.

21. A method for detecting one or more faces in an unknown input image as in claim 10, wherein the method can be run on any personal computer.

\* \* \* \* \*